Dec. 24, 1929.　　　　M. LUERY　　　　1,740,949
BABY SWING
Filed Feb. 19, 1926　　2 Sheets-Sheet 1
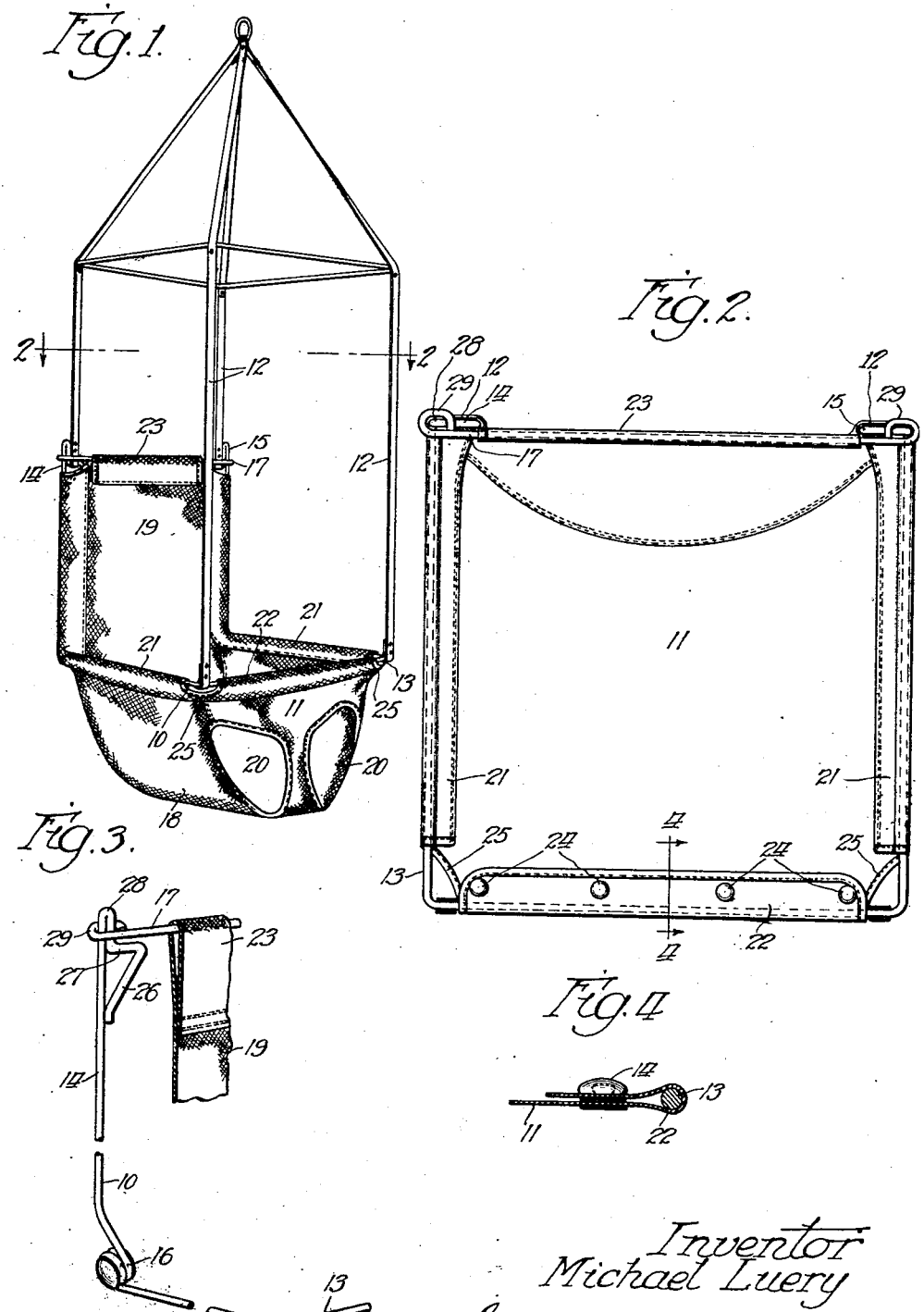
Inventor
Michael Luery Dec. 24, 1929.   M. LUERY   1,740,949
BABY SWING
Filed Feb. 19, 1926   2 Sheets-Sheet 2

Inventor
Michael Luery
George E. Mueller Atty.

Patented Dec. 24, 1929

1,740,949

UNITED STATES PATENT OFFICE

MICHAEL LUERY, OF CHICAGO, ILLINOIS

BABY SWING

Application filed February 19, 1926. Serial No. 89,422.

The invention relates to swings, and primarily to devices of this character which are particularly adapted for use by infants and in which the seat and other portions are fashioned of suitable material such as fabric with a frame with which a suspension means for the swing is also connected.

It is a prime object of the invention to fashion the material of which the seat, etc., is formed so that it may be conveniently associated with and removed from the frame for the purpose of cleansing or substituting another in its stead.

It is a further object of the invention to fashion the material of which the seat is formed so that a pocket shaped seat is produced having openings through which the limbs of the infant may be projected, and in addition provides a back rest and also a tray in the latter of which toys, etc., may be held in convenient relation to the infant.

It is another object of the invention to construct the frame for the material of which the seat, etc., are formed so that the association and removal of the material and the frame is facilitated and a back rest and tray may, when so desired, be provided through the assistance of the frame.

It is a further feature of the invention to construct the frame so that the associaton and removal of the suspension means and the frame is facilitated, and to form the frame so that it provides a support for a detachable element of the frame, the latter of which when detached from the main frame permits the material or fabric of which the seat, back and tray are formed to be readily removed from the main frame.

It is an additional object of the invention to provide a frame structure in which certain parts are connected together to permit the collapse of the main frame to thereby reduce the space required during shipment or storage of the swing.

It is a further object of the invention to provide the fabric with a hem within which the main frame and other portions of the frame are located and to provide one portion of the hem with means whereby the portions forming the hem may be separably connected together to thereby expose and release a portion of the main frame and allow the material of which the seat, etc., are formed to be removed from the main frame.

The invention will be explained and more readily understood when read in conjunction with the accompanying drawings, which illustrate various forms of which the invention is susceptible, it being therefore obvious that other changes and modifications may be resorted to without departing from the spirit of the appended claims forming a part hereof.

In the drawings, Fig. 1 is a perspective view of a swing embodying certain features of the invention;

Fig. 2 is a section taken on line 2—2 of Fig. 1;

Fig. 3 is a detail perspective view of a portion of the main frame employed in conjunction with the structure shown in Fig. 1;

Fig. 4 is a section taken on line 4—4 of Fig. 2;

Figure 5:
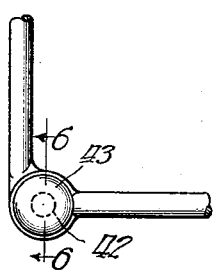
Fig. 5 is a side elevation of a hinge structure for connecting the sections of the frame forming the sides and back together.

The embodiment of the invention illustrated in Fig. 1 contemplates the use of a main frame 10, the material 11 associated with the main frame, and the suspension means 12 whereby the swing is supported. The main frame 10 is formed of a U-shaped member 13, and the members 14 and 15 which are hingedly connected at 16—16 to the opposite ends of the main frame.

A cross piece 17 is employed to assist in holding the back rest of the swing in an extended condition. This cross piece 17 extends from one of the members 14 to the other member 15, is supported thereby at the ends thereof and is provided with means for engaging said members 14 and 15 to hold said cross piece and members 14 and 15 in associated relation.

The material 11 may be formed of any suitable fabric, is fashioned to provide a pocket-like seat 18 and the back 19, and has one side wall of the pocket provided with openings 20—20, through which the legs of an infant may be projected when arranged in the seat. The edges of the material forming the seat 12 and back 19 are each provided with a hem respectively, designated 21—21 and 22 and 23, within which the U-shaped frame 13, the members 14 and 15 and the cross piece 17 are located. The hem 22 is of a separable character and is therefore provided with a plurality of fasteners 24—24, shown in detail in Fig. 4, and is constructed in this manner to allow the material 11 to be detached or removed and secured to the frame composed of the members 13, 14, 15 and 17. The material of the seat is cut away at the corners of the U-shaped frame as indicated at 25, to expose the U-shaped frame and permit the attachment of a portion of the suspension means 12.

The upper ends of the members 14 and 15 are bent or formed as clearly shown in Fig. 3, to form a hook 26, the part 27 to which certain other elements of the suspension means are connected and in addition is also provided with the part 28 which forms a stud, provided for engagement by the cross piece 17, the ends of which cross piece are formed to provide the eyes 29—29, which are passed over said studs and thereby maintain the associated relation of the cross piece and members 14 and 15, yet allow the disconnection of the cross piece from said members 14 and 15.

From the foregoing description of the construction and particularly the construction of the hem 22 and the combination of the cross piece which is separable from the main frame, it is manifest that upon separation of the hem 22 the material forming the seat may be slid endwise along the side portions of the U-shaped frame and together with the back along the members 14 and 15 toward the cross piece 17, which after the disconnection of the suspension means from the hook 26 allows the removal of the fabric and the cross piece 17 from the main frame.

It is understood that the hook 26 is resilient so that it may spread to allow the association and removal of that part of the suspension means which cooperates with the part 27 thereof.

In view of the fact that the cross piece 17 is removably located in the hem 23 the cross piece 17 may be removed from association with the back 19 of the swing and will thus allow the material forming the seat and back to be laundered or replaced without hindrance by said cross piece. The structure illustrated in Figs. 7 and 8 discloses a means whereby a swing of the character described may be supplied with a portion forming a tray. To provide this latter structure a bar 30 is employed and located transverse to the closed end of the U-shaped frame 31 and in spaced relation thereto, and provides a support for one edge of the material forming the tray 32 and the seat 33.

The remaining structure of the swing may correspond to that described in connection with Fig. 1 and therefore will not be again described in detail. The bar 30 is bent at its opposite ends transversely of its length and is threaded to respectively receive the screws 34 whereby the bar 30 is removably held with respect to the U-shaped frame 31.

The fabric or material of which the tray and seat are formed is as in the previously described construction provided with a hem for receiving the members forming the frame, to thereby permit the removal and association of the fabric with the frame.

Figure 7:
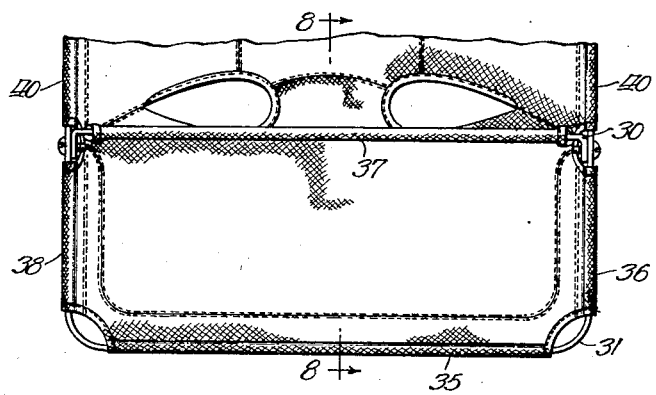
Fig. 7 is a fragmentary plan view of a structure providing a combined seat and tray.
Figure 8:
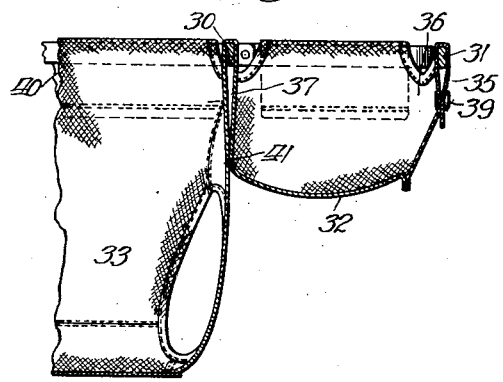
Fig. 8 is a section taken on line 8—8 of Fig. 7.

In the structure illustrated in Figs. 7 and 8, the bar 30 is removable from the main frame and from a hem within which it is located, which will thus allow the material forming the seat and tray to be moved along the main frame to permit the removal and association of the material relative to the frame.

To produce the tray 32 the edges of the material forming the tray are each formed to provide a hem as indicated at 35, 36, 37 and 38, for respectively receiving the front and side portions of the U-shaped frame 31 and the cross piece or bar 30. The hem 35 is of a separable character held in closed and associated relation with the bar 30 by means of the fasteners 39 which when the hem 35 is separated, allows the material forming the seat and tray to be slid along the sides of the U-shaped frame and be removed from the main frame in a manner similar to that explained with relation to the structure shown in Fig. 1.

It is understood that the seat portion 33 is provided with leg openings and is also provided with hems such as 40—40, the latter of which permit the seat portion to be moved along the sides of the frame 31 to allow the association and removal of the material forming the seat and tray from the frame.

From an inspection of Fig. 8 it is evident that the seat and tray are formed of a single piece of material, the hem 37 being constructed by sewing or otherwise fastening the material together as at 41.

Figure 6:
Fig. 6 is a section taken on line 6—6 in Fig. 5.

The structure illustrated in Figs. 5 and 6 differs at the hinge 42 from that shown in Fig. 3, in that the hinge in the latter structure is formed by bending the ends of the U-shaped frame and the members 14 and 15 into the shape of an eye, whereas the pivot 42 is formed by flattening the ends of the same elements, providing an aperture in each and connecting said ends together by a pivot pin 43 having the enlargements 44.

From the foregoing description of the construction it is manifest that a simple and effective structure is provided whereby material formed to produce a seat and back, and also a tray, may be readily removed and applied to a frame which forms a support for the seat, back and tray.

It is further evident that the construction of the frame is such that it may with the material forming the seat, etc., be folded so as to result in a compact arrangement which will thus consume only a relatively small space during shipment or storage.

In addition it is evident that a frame is provided having a construction whereby the suspension means for the swing may be attached and removed from associated relation with the frame and also that the frame is so formed by means of the stud hereinbefore referred to, to provide a means whereby a cross piece or support for the material or fabric may be detachably connected with the main frame to allow the fabric to be removed from the frame.

What I claim as new and desire to secure by United States Letters Patent is:—

1. In a swing of the character described, the combination of a frame and flexible material associated with the frame and formed to provide a seat and a back, the edges of said flexible material being formed to provide a hem for the reception of the frame, the hem being separable along a portion of the frame to release the material from the frame and allow the removal of the material from the frame endwise of said frame.

2. In a swing adapted to be suspended from a plurality of suspension cords, a frame and a fabric seat portion associated with and removable therefrom, said frame comprising a U-shaped integral member with a pair of rod members pivoted to the ends thereof to form a support for a back rest, the ends of said rods being bent back on themselves to form blunt ends and a loop into which the suspension cords are adapted to be caught, and a transverse frame member having loops at the ends thereof extending over the ends of said pair of rod members and resting on the loops thereof, and said seat portion having integral hems along the sides and across the back thereof with a hem supported by snap fasteners secured across the front thereof, whereby a quickly removable fabric seat results.

In witness whereof, I hereunto subscribe my name this 17 day of February, 1926.

MICHAEL LUERY.